United States Patent [19]
Hirata

[11] Patent Number: 5,786,966
[45] Date of Patent: Jul. 28, 1998

[54] MAGNETIC TAPE CASSETTE HAVING IMPROVED GUARD PANEL STRUCTURE

[75] Inventor: Hidetoshi Hirata, Kanagawa, Japan

[73] Assignee: Fuji Photo Film Co., Ltd., Kanagawa, Japan

[21] Appl. No.: 974,209

[22] Filed: Nov. 10, 1992

[30] Foreign Application Priority Data

Nov. 13, 1991 [JP] Japan .................... 3-101046 U

[51] Int. Cl.⁶ ............................................ G11B 23/04
[52] U.S. Cl. ............................... 360/132; 242/347.1
[58] Field of Search ........................ 360/132; 242/198, 242/199, 200, 347.1; 220/343

[56] References Cited

U.S. PATENT DOCUMENTS

| | | | |
|---|---|---|---|
| 4,669,021 | 5/1987 | Wakui et al. | 360/132 |
| 4,698,713 | 10/1987 | Kawada | 360/132 |
| 4,750,074 | 6/1988 | Oishi | 360/132 |
| 4,779,157 | 10/1988 | Ishida et al. | 360/132 |
| 4,780,783 | 10/1988 | Osawa et al. | 360/132 |
| 4,893,724 | 1/1990 | Schiemann | 220/343 |
| 4,928,197 | 5/1990 | Park et al. | 360/132 |
| 4,933,796 | 6/1990 | Tanaka | 360/132 |
| 4,984,122 | 1/1991 | Sato | 360/132 |
| 4,989,806 | 2/1991 | Eggebeen | 360/132 |
| 5,169,088 | 12/1992 | Lovecky et al. | 242/199 |
| 5,205,431 | 4/1993 | Zinnbauer | 220/343 |

*Primary Examiner*—Jefferson Evans
*Attorney, Agent, or Firm*—Sughrue, Mion, Zinn, Macpeak & Seas, PLLC

[57] ABSTRACT

A cassette for a VCR or the like is provided with a guard panel for covering a front surface opening of the cassette. The guard panel is provided with side plates at opposite ends thereof, and the side plates each have a support shaft for roratably mountin the guard panel to the cassette. One of the side plates is provided with a rib which is received in a gap formed in the cassette so that the guard panel, when covering the front surface opening of the cassette, is prevented from being dislodged by a shock or the like such as when the cassette is accidentally dropped. Alternatively, the cassette may be provided with a rib which fits into a stepped portion formed on one of the side plates to achieve the same result.

3 Claims, 4 Drawing Sheets

MAGNETIC TAPE CASSETTE HAVING IMPROVED GUARD PANEL STRUCTURE

BACKGROUND OF THE INVENTION

The present invention relates to a magnetic tape cassette including a pair of tape winding members rotatably mounted in a cassette case with a magnetic tape being would around the tape winding members for recording and reproduction. The cassette case is formed from upper and lower cassette halves, and the magnetic tape cassette includes a guard panel positioned over a front surface opening of the cassette to cover or expose the front surface opening.

In conventional magnetic tape cassettes such as for use in audio equipment, video equipment and the like, a magnetic tape is wound around a pair of tape winding members (reels or hubs) rotatably supported within the cassette case. When designed for use in video equipment such as VHS, β, 8 mm, VCRs and the like, the upper and lower cassette halves are typically formed from a synthetic resin such as ABS (acrylonitrile butagiene styrene) or the like.

A description is provided below, with reference to FIGS. 8–12, of a conventional magnetic tape cassette for use in, for example, a VHS system.

A conventional magnetic tape cassette 1, as shown in FIG. 8, includes a main body which is assembled by securing an upper cassette half 1a to a lower cassette half 1b. The cassette 1 further includes a front surface opening for exposing the magnetic tape. The front surface opening is covered by a movable guard panel 2 which protects the magnetic tape when the cassette is removed from the recording or playback device.

When the cassette is removed from hardware such as a VCR or the like, the guard panel 2 is biased toward the closed position by a spring or the like (not shown) provided within the cassette, and the guard panel 2 is locked in the closed position by a lock member. When the cassette is loaded into the VCR, the guard panel 2 is unlocked and rotated upwardly (in the direction indicated by the arrow a in FIG. 8) against the energizing force of the spring so that the magnetic tape can be drawn out through the front surface opening of the cassette to complete the tape loading operation.

A pair of transparent window members 4 are provided on the surface of the upper half case 1a. These members 4 permit the user to observe the pair of tape winding members 5 rotatably disposed within the upper and lower half cases 1a and 1b, the magnetic tape wound around the tape winding members 5, and the leading ends of a leaf spring 6 used to resiliently hold the pair of tape winding members 5 in position.

Thus, the window members 4 make it possible to observe the winding and running condition of the magnetic tape wound around the pair of tape winding members 5. Also, part of the magnetic tape is exposed to the front surface opening when the guard panel 2 is rotated in the direction of the arrow a shown in FIG. 8.

The support structure for the left end of the guard panel 2 for the cassette shown in FIG. 8 is constructed as shown in FIGS. 9 and 10, while the support structure for the right end of the guard panel 2 is constructed as shown in FIGS. 11 and 12.

As for the left-end support structure (FIGS. 9 and 10), an insertion hole 11 is formed along a line A between the upper cassette half 1a and the lower cassette half 1b. That is, the insertion hole is defined when the two halves are joined together. Also, a support shaft 12 is provided on a left side plate 2a, disposed on the left side of the guard panel 2, so as to extend inwardly from the left side plate 2a. In the middle portion of the support shaft 12, an engagement pin 13 engages one end of a spring 14 which energizes the guard panel 2 towards the closed position. The engagement pin 13 extends at a right angle to the support shaft 12. The distance between the engagement pin 13 and the inner surface of the left side plate 2a is slightly greater than the thickness of the upper and lower cassette halves 1a and 1b.

The guard panel 2 is provisionally secured in the upper half cassette 1a before the upper and lower cassette halves 1a and 1b are finally secured together. In this provisionally secured condition, while the spring 14 is mounted onto the support shaft 12 by use of an assembly device, another support shaft 23 (see FIG. 12) disposed on the opposite side of the guard panel 2 is inserted at an angle into an insertion hole 21 formed in the upper cassette half 1a, and the guard panel 2 is then rotated along the surface of the cassette half about the support shaft 23 inserted in the insertion hole 21, thereby positioning the support shaft 12 so that it can be fitted into the insertion hole 11. This operation allows the front edge portion of the upper cassette half 1a to be held between the leading end portion of the spring 14 and the upper end wall of the guard panel, so that the upper and lower cassette halves 1a and 1b are connected together in a provisionally secured manner.

Next, a description will be given of the right-end support structure of the guard panel 2 with reference to FIGS. 11 and 12. The insertion hole 21 is formed in the upper cassette half 1a in such a manner that a support shaft 23 can be inserted through the insertion hole 21. A tape guide 22 is mounted on one side of the insertion hole 21 for guiding the magnetic tape between the pair of tape winding members 5. The support shaft 23 is provided on a right side plate 2b disposed at the right end of the guard panel 2, and the support shaft 23 extends inwardly from the right side plate 2b, the support shaft 23 being shorter than the above-mentioned support shaft 12.

After the guard panel 2 is mounted to the upper cassette half 1a in the above-mentioned manner, the upper cassette half 1a is positioned over the lower cassette half 1b with necessary parts incorporated therein, and the upper and lower cassette halves are fastened together by use of screws or the like.

According to the above-mentioned conventional support structure of the guard panel 2, the support shaft 12 is made sufficiently long so that the shaft 12 is prevented from slipping out of position by the engagement pin 13. However, in the right-end support structure, as assembled in the above conventional manner, the support shaft 23 cannot be made sufficiently long. Consequently, no slippage-preventive structure can be provided. Thus, if the magnetic tape cassette 2 is dropped during handling, or if a strong force is applied to the guard panel 2, the support shaft 23 may slip out of position or be forced out of the insertion hole 21 so that the guard panel 2 is also displaced. When such accidents occur, the front surface opening is exposed, and the magnetic tape may be damaged or slackened, so that good recording and reproduction cannot be achieved.

Also, if a strong shock force is applied, the guard panel 2 may slip out of position so that large forces are applied to the support shaft 12 provided at the left end of the guard panel 2, with the result that the support shaft 12 may be broken. In this case, a part of the broken support shaft 12 may remain within the case, and the guard panel 2 may be made unmountable, which makes it impossible for the tape cassette to be used.

SUMMARY OF THE INVENTION

The present invention is directed to a device for eliminating the drawbacks found in the above-described conventional magnetic tape cassettes. Accordingly, it is an object of the invention to provide a magnetic tape cassette which is capable of restricting the lateral movement of a guard panel for covering the front surface opening of the magnetic tape cassette to thereby prevent the guard panel from slipping out of position to thereby improve the reliability of the magnetic tape cassette.

In order to achieve the above object, according to a first embodiment of the present invention, a magnetic tape cassette is provided including a pair of rotatably mounted tape winding members for supporting a magnetic tape, the cassette being formed from upper and lower cassette halves and including a guard panel. The guard panel, which is rotatable about two support shafts provided on opposite end portions of the guard panel, covers or exposes a front surface opening through which the magnetic tape is run. A rib is provided on each of the side plates of the guard panel, in addition to the support shafts for rotatably supporting the guard panel, the rib having a thickness smaller than the thickness of the side plate, extending along the surface of the side plate and projecting out from the side plate. A gap is formed on the side of the main body of the magnetic tape cassette for receiving the rib to thereby restrict the movement of the rib in its thickness direction (right to left or vice versa) when the guard panel is closed. Thus, when a front surface opening of the cassette is covered by the guard panel, the rib is received in a gap formed by the upper and lower cassette halves so as to restrict lateral movement of the guard panel.

Alternatively, in a second embodiment, a stepped portion is provided on each of the side plates of the guard panel, in addition to the support shafts for rotatably supporting the guard panel, the stepped portion being disposed on the outer surface and lower edge side of the side plate and having a thickness smaller than the thickness of the side plate. A rib is provided on the main body of the cassette, the rib being fittable into the stepped portion so as to cover the same when the guard panel is closed, and to thereby restrict the movement of the guard panel in the lateral direction thereof.

DESCRIPTION OF THE PREFERRED EMBODIMENTS

A description will be provided below with respect to a first embodiment of a magnetic tape cassette according to the present invention, with reference to FIGS. 1 to 4.

Figure 1:
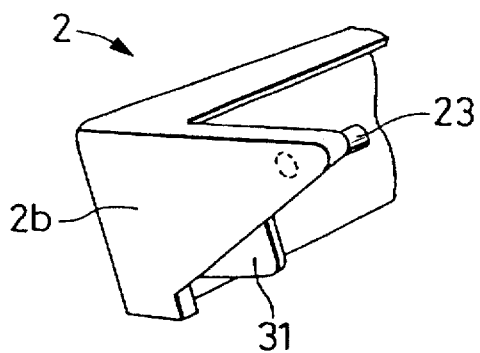
FIG. 1 is a perspective view of a right end portion of the guard panel according to a first embodiment of the present invention.
Figure 4:
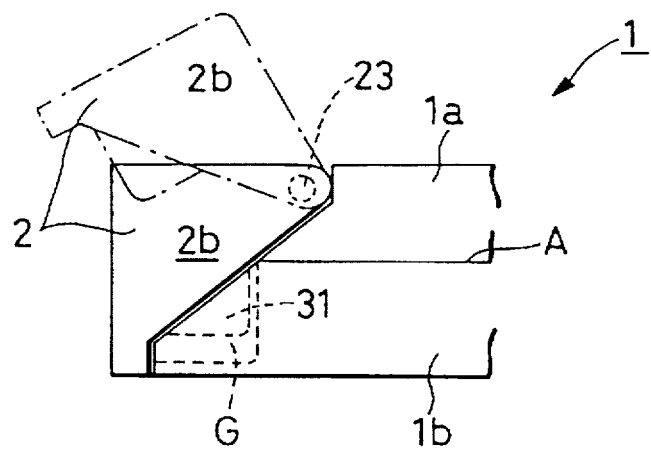
FIG. 4 is a side view of the main portions of a magnetic tape cassette and guard panel according to the first embodiment of the present invention, showing the open and closed positions of the guard panel.
Figure 2:
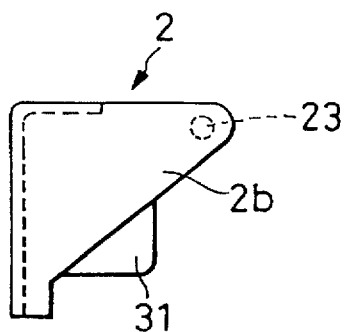
FIG. 2 is a side view of the same portion of the guard panel shown in FIG. 1.
Figure 3:
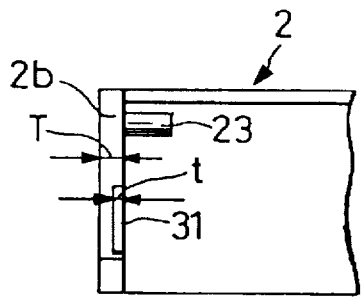
FIG. 3 is a different side view of the same portion of the guard panel shown in FIG. 1.

FIG. 1 is a perspective view of the main portions of a right end of a guard panel, FIG. 2 is a side view of the right end of the guard panel shown in FIG. 1, FIG. 3 provides another view of the right end of the guard panel shown in FIG. 1, and FIG. 4 is a side view of a magnetic tape cassette according to the present invention, showing the positions of the guard panel. The figures and reference characters used with respect to the description of the conventional magnetic tape cassette identify similar parts in the present embodiment.

In the present embodiment, a rib 31 is provided on the lower oblique surface of a right side plate 2b forming one end of the guard panel 2, as shown in FIGS. 1 to 4. The rib 31 prevents the guard panel 2 from slipping out of position. The provision, size and shape of the rib 31 are as described below.

The lateral movement of the guard panel 2, that is, the movement of the guard panel 2 in the right-to-left or left-to-right directions, should be restricted in order to prevent the guard panel 2 from slipping out of position, as previously discussed with respect to the conventional magnetic tape cassette. However, the shape and dimensions of the magnetic tape cassette 1 are restricted by the type of recording apparatus into which the cassette 1 is to be loaded. Thus, it is not possible to change the shape and dimensions of the magnetic tape cassette to any great extent. Also, since the upper and lower cassette halves 1a and 1b are formed by means of a metal mold, it is also not desirable to significantly change the shape of the mold.

The present invention is intended to circumvent the above-described limitations by incorporating a rib 31 which fits into a triangular gap G formed in the lower cassette half 1b of the conventional cassette to thereby restrict the lateral movement of the guard panel 2.

Figure 11:
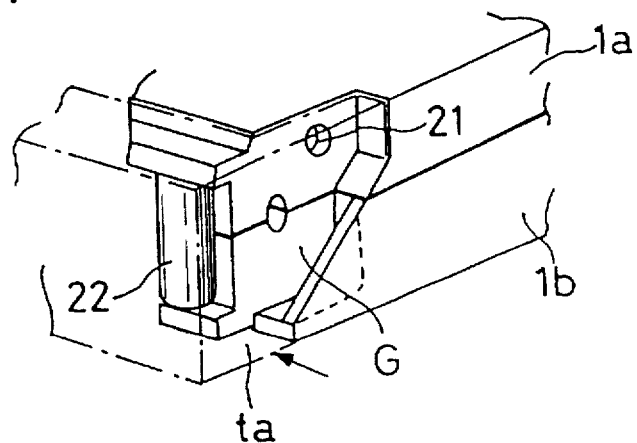
FIG. 11 is a perspective view of a right front end portion of the conventional magnetic tape cassette.
Figure 12:
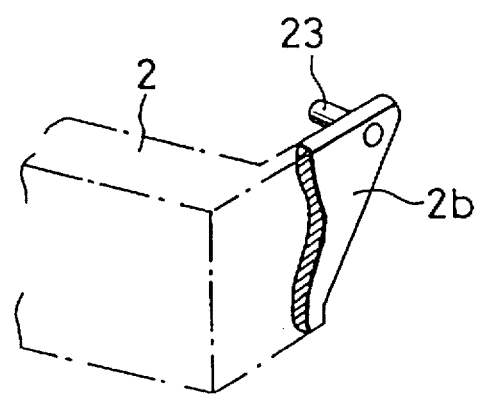
FIG. 12 is a perspective view of a right end of the conventional guard panel.

The size of the rib 31 is determined according to the size of the receiving gap G, as shown by a dotted line in FIG. 4. The thickness T of the above-mentioned right side plate 2b is substantially equal to the width ta (see FIG. 11) of an oblique surface portion in which the gap G is formed. The rib 31 is provided along the inside of the oblique surface of the right side plate 2b. Also, the thickness t of the rib 31 is, as shown in FIG. 3, smaller than the thickness T and the width of the gap G. The gap G is formed such that it opens toward the front and upper portions of the cassette.

As shown in FIG. 4, when the upper and lower cassette halves 1a and 1b are superimposed, the rib 31 is able to enter the gap G quite smoothly. Also, as shown by the dotted line in FIG. 4, the guard panel 2 can be rotated smoothly to expose the tape.

When the rib 31 is inserted as shown by a dotted line in FIG. 4, the guard panel 2 is prevented from moving laterally by the juxtaposition of the rib 31 and the gap G. Therefore, even if a shock force is applied to the guard panel 2 when, for example, the cassette is dropped, the guard panel 2 does not slip out of position.

Also, since only the rib 31 need be provided on the right side plate 2b, the present magnetic tape cassette can be produced in the same fashion as the conventional cassette simply by changing a relatively small portion of the metal mold used to form the guard panel 2.

Figure 8:
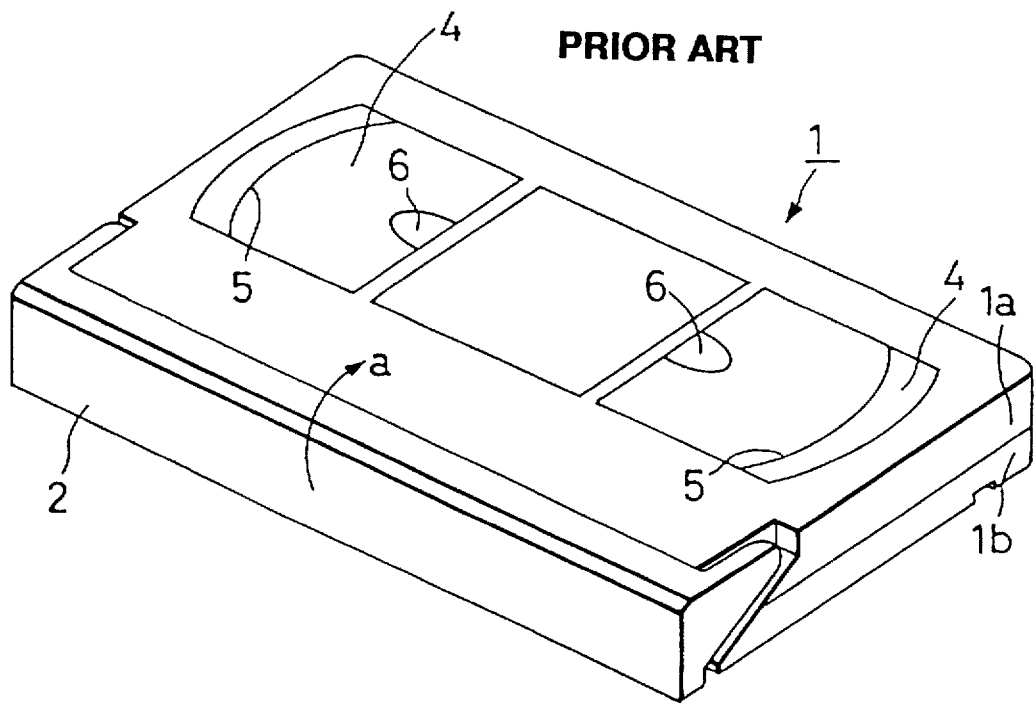
FIG. 8 is a perspective view of a conventional magnetic tape cassette.
Figure 9:
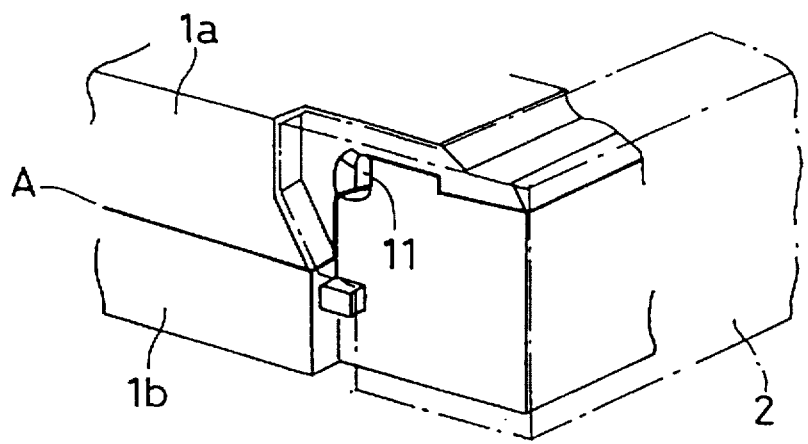
FIG. 9 is a perspective view of a left front corner portion of the conventional magnetic tape cassette.
Figure 10:
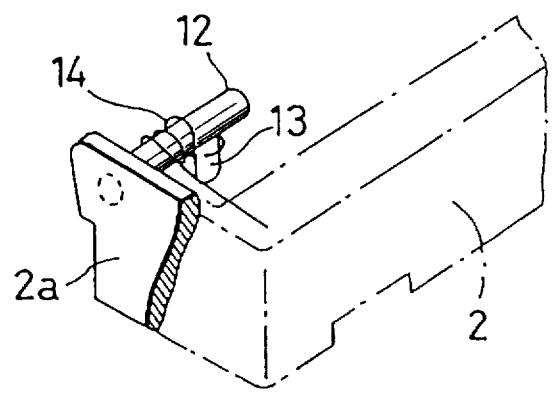
FIG. 10 is a perspective view of a left end of a conventional guard panel.

The outer appearance and shape of the magnetic tape cassette 1 when assembled are entirely the same as the conventional cassette described previously with reference to FIG. 8.

Figure 5:
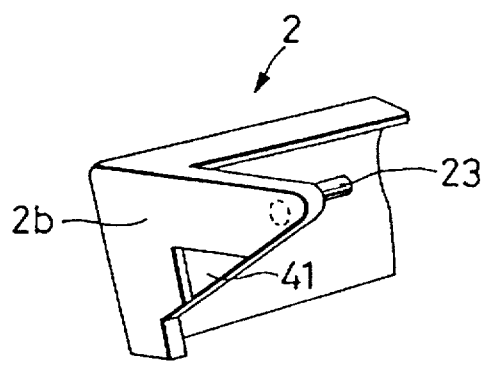
FIG. 5 is a perspective view of a right end portion of the guard panel according to a second embodiment of the present invention.
Figure 6:
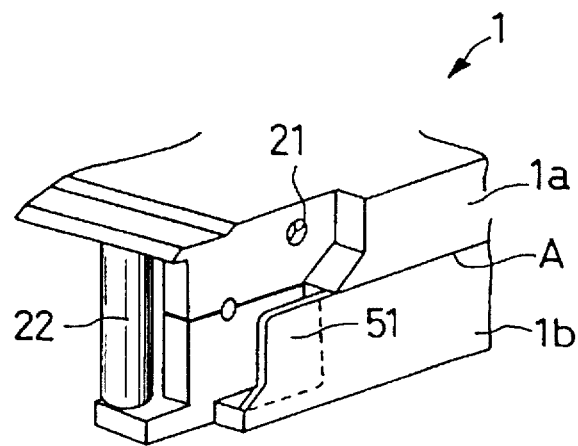
FIG. 6 is a perspective view of a right end portion of the magnetic tape cassette according to the second embodiment of the present invention.
Figure 7:
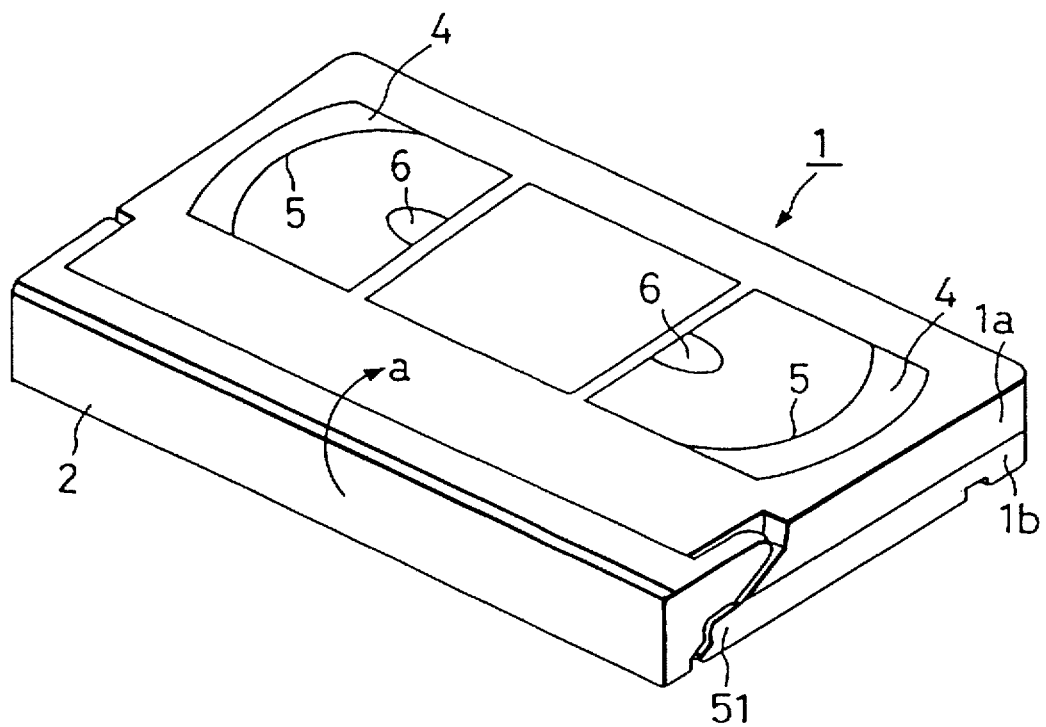
FIG. 7 is a perspective view of the magnetic tape cassette according to the second embodiment of the invention.

Next, a description will be provided of a second embodiment of a magnetic tape cassette of the present invention with reference to FIGS. 5 to 7. FIG. 5 is a perspective view of the right side plate 2b, FIG. 6 is a perspective view of the right front side of the magnetic tape cassette 1, and FIG. 7 is a perspective view of the magnetic tape cassette 1 of the second embodiment.

In the second embodiment, in place of the rib 31, a stepped portion 41 (FIG. 5) is provided on the outer surface of the right side plate 2b, and in the lower cassette half 1b, a rib 51 (FIG. 6) is provided which fits into the stepped portion 41. Parts which have been previously described and are similar to those described with respect to the second embodiment are identified by the same reference numerals, and a further description of these parts is, therefore, omitted.

In the second embodiment, as shown in FIG. 5, the stepped portion 41 is provided on the outer surface of the right side plate 2b of the guard panel 2. The thickness of the stepped portion 41 is set in accordance with the thickness of the rib 51 (to be described later), and the thickness of the stepped portion 41 may be equal to the thickness of the rib 51.

On the right side of the magnetic tape cassette 1 (FIG. 6), and in the lower portion of the insertion hole 21, a rib 51 is provided by extending a leading end portion of the lower cassette half 1b. When the rib 51 is fitted into the stepped portion 41, the rib 51 restricts the lateral movement of the guard panel 2.

The guard panel 2 is mounted similarly as in the conventional magnetic tape cassette. When the rib 51 is fitted in the stepped portion 41, a part of the right side plate 2b is accommodated within the lower cassette half 1b. Thus, in the second embodiment, as well as in the above-described first embodiment, the movement of the guard panel 2 in the lateral direction is restricted to thereby prevent the guard panel 2 from slipping out of position, even if shock forces are applied to the guard panel 2.

Also, there is no necessity for significantly changing the conventional metal mold used to form the guard panel 2 and lower cassette half 1b. Thus, the second embodiment can be manufactured similarly to the conventional magnetic tape cassette.

Furthermore, since the rib 51 is formed by extending the leading end of the lower cassette half 1b, it is not necessary to form projections on the outer surface of the magnetic tape cassette. Thus, as shown in FIG. 7, the right side surface of the magnetic tape cassette 1 provides the same even surface as in the conventional cassette, which enhances operation of the magnetic tape cassette 1.

In the first and second embodiments of the invention, the shapes of the ribs 31 and 51 are substantially triangular. However, the ribs are not limited to this shape, i.e., the ribs can be properly formed in other shapes according to the desired use.

As has been described above, according to the magnetic tape cassette of the present invention, a rib having a thickness smaller than the thickness of the side plate is provided on one of the side plates of a guard panel and is inserted into a gap formed in a cassette half to prevent lateral motion of the guard panel with respect to the case. Alternatively, a stepped portion is provided on the outer side surface of the above-mentioned side plate so as to exhibit a smaller thickness than the side plate, and a rib is provided on the cassette which fits into the stepped portion.

As a result of the above-mentioned structure, when the guard panel is closed, the rib is inserted into the gap, or the rib is fitted into the stepped portion, to thereby restrict the movement of the guard panel in the lateral direction. Thus, even when relatively large external forces are applied to the guard panel, the support shafts of the guard panel are prevented from slipping out of position on the main body of the magnetic tape cassette. As a result, the magnetic tape cassette is considerably more reliable than the conventional cassette.

What is claimed is:

1. A magnetic tape cassette comprising:

a cassette case comprising upper and lower cassette halves defining therebetween a front surface opening;

a pair of tape winding members rotatably supported within said case;

a magnetic tape wound around said members;

a guard panel for covering said front surface opening, said guard panel including two side plates at opposite ends thereof;

two support shafts provided, respectively, on said two side plates of said guard panel for rotatably mounting said guard panel to said case; and a rib provided on one of said two side plates as an integrally molded part of said one of said two side plates, said rib having a thickness smaller than a thickness of said one of said two side plates and extending along an edge surface of said one of said two side plates, said rib having an inner surface which faces toward a central portion of said case and an outer surface which faces away from said central portion, said rib projecting from said one of said two side plates so that said rib is received in a gap formed on a side of said case adjacent to said one of said two side plates, said gap conforming in size and shape to said rib and having an opposing surface which opposes said outer surface to thereby restrict lateral movement of said guard panel when said guard panel covers said front surface opening.

2. A magnetic tape cassette comprising:

a cassette case comprising upper and lower cassette halves defining therebetween a front surface opening;

a pair of tape winding members rotatably supported within said case;

a magnetic tape wound around said members;

a guard panel for covering said front surface opening, said guard panel including two side plates at opposite ends thereof;

two support shafts provided, respectively, on said two side plates of said guard panel for rotatably mounting said guard panel to said case; and a stepped portion disposed on an outer edge surface and a lower edge side of one of said two side plates and having a thickness smaller than a thickness of said one of said two side plates, said stepped portion having an opposing surface which faces away from a portion of said case;

a rib provided as an integrally molded part of a main body of said cassette, said rib having an inner surface which faces toward said central portion and an outer surface which faces away from said central portion, said rib being fittable within said stepped portion, said stepped portion conforming in size and shape to said rib, so as to cover said stepped portion and so that said opposing surface is in opposition to said inner surface when said guard panel covers said front surface opening thereby restricting movement of said guard panel when said guard panel covers said front surface opening.

3. The magnetic tape cassette of claim 2, wherein said thickness of said stepped portion is substantially equal to a thickness of said rib.

* * * * *